E. A. KROH.
SAFETY CHAIN TIGHTENER AND CLAMP.
APPLICATION FILED JULY 8, 1922.
1,438,766.
Patented Dec. 12, 1922.
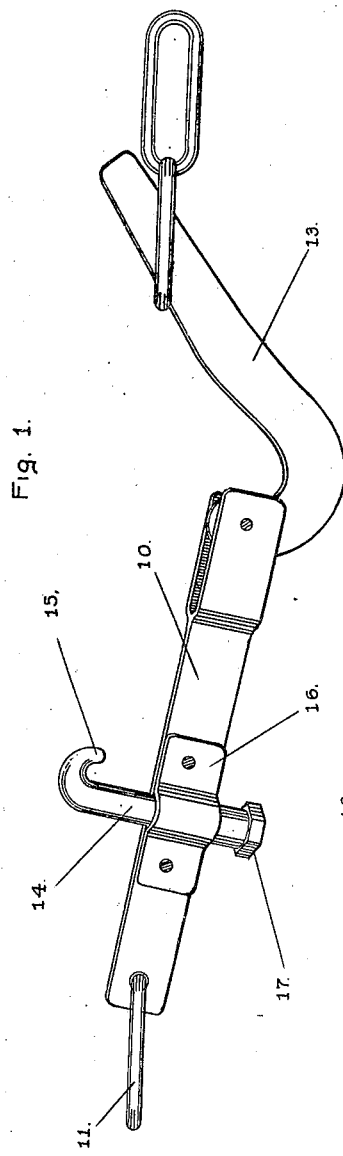
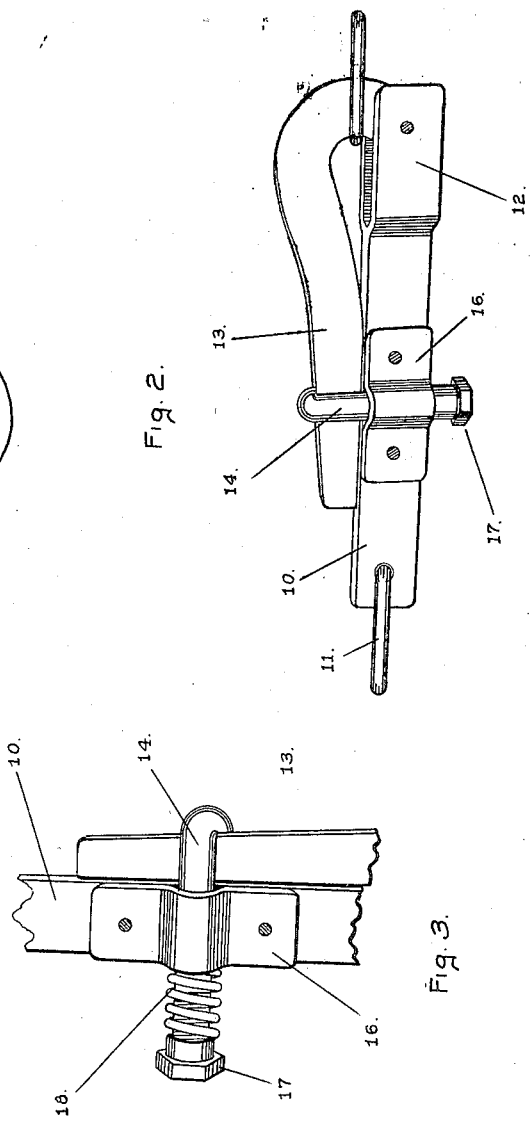
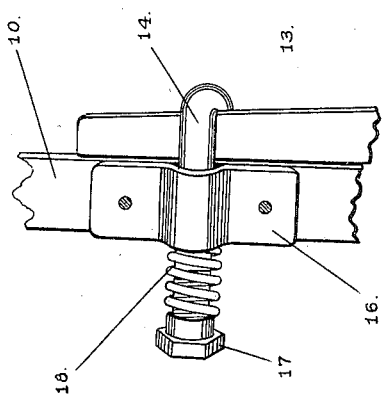
EDWARD A. KROH  INVENTOR.
BY
*Emil F. Lange* ATTORNEY Patented Dec. 12, 1922.

1,438,766

UNITED STATES PATENT OFFICE.

EDWARD A. KROH, OF STELLA, NEBRASKA.

SAFETY CHAIN TIGHTENER AND CLAMP.

Application filed July 8, 1922. Serial No. 573,593.

*To all whom it may concern:*

Be it known that I, EDWARD A. KROH, a citizen of the United States, residing at Stella, in the county of Richardson and State of Nebraska, have invented certain new and useful Improvements in Safety Chain Tighteners and Clamps, of which the following is a specification.

My invention relates to safety chain-tighteners and clamps, and the object of my invention is the provision of a device whereby all slack can be taken out of an automobile tire chain with the minimum amount of time and work, and whereby the chain can be drawn tighter than with any of the clamps heretofore in use. Especially is it my object to provide a clamp which can be used in all kinds of weather, and which will not fill up and clog with snow, ice, or mud, to the action of all of which the automobile tire and its clamp are apt to be subjected.

Having in view these and other objects which will appear in the description I will now refer to the drawings, in which Figure 1 is a view in plan of my clamp as it appears when open and in position to begin the clamping operation.

Figure 2 is a similar view showing the clamp closed and locked, the view being from a slightly different angle than that in Figure 1.

Figure 3 shows a modification of the locking device.

Numeral 10 designates the body of my clamp. This body portion 10 is substantially straight and made of any suitable material. At one of its ends it has an aperture for the reception of the end 11 of the automobile chain and at its other end it is bifurcated at 12, as shown in Figure 2.

Between the bifurcations at 12 I pivot the end of a cam lever 13 which is but very little shorter than the body portion 10 of the clamp. The lever 13 consists of two parts: the curved part adjacent the pivot and the substantially straight part at its outer extremity. The straight part has an outer curved edge and tapers with the narrowest part of the taper at the extremity. The width of the lever 13 is such that the lever can readily enter one of the links of the chain.

The operation thus far will be readily apparent from an inspection of the drawing. The end link 11 of the chain is secured to the body portion of the clamp either by passing the link directly through the aperture or by fastening it with a piece of wire. The clamp is then opened and the lever 13 is passed through the opposite end link or an intermediate link, as shown in Figure 1, the lever 13 being then closed in on the body portion to tighten the chain. This process can be repeated as often as necessary to bring about the requisite tension in the chain.

After the chain has been tightened it is necessary that the lever 13 be locked to the body portion of the clamp. For this purpose I have provided a stem 14 having a hook 15 which is adapted to fit over the lever 13. A plate 16 is riveted or otherwise secured to the body 10. The plate 16 is bent at its middle so as to form with the contiguous wall of the body an opening of such size that the stem 14 can slide freely therethrough. The stem 14 is screw-threaded on its end opposite the hook 15, and a cap 17 is similarly screw-threaded to fit onto the screw-threaded end of the stem 10. By this means the clamp can be securely locked to maintain the tension in the chain.

In Figure 3 I show a modification of my invention. This modification merely involves the use of a spring with the structure already shown and described. The coiled spring 18 surrounds the screw-threaded portion of the stem 14 and is placed therein by first removing the cap 17, whereupon the spring can be readily slipped into position the cap being then replaced to regulate the compression in the spring. The advantage of the spring will be apparent. When it is desired to unlock the lever arm 13, it is only necessary to apply a slight pressure with the thumb to the cap 17 and to give it only enough twist to release the hook 15 from engagement with the arm 13. Should it be desired however to leave the chains in place for any great length of time, or should the spring become lost or broken the cap 17 can be screwed home to hold the clamp in locked position.

From the foregoing description it will be seen that I have provided a clamp which is extremely simple in construction and very efficient in operation. Of prime importance however are the features which prevent trouble from mud and ice. If the cap 17 becomes too tight to be loosened by the fingers, the pliers will loosen it. No matter how tightly the stem 14 becomes rusted or frozen, a few taps with the pliers on the screw end of the stem will dislodge it.

Having thus described my invention and the manner in which it is used, what I believe to be new and desire to secure by Letters Patent of the United States is:—

A chain-tightening clamp comprising a body portion, means at one end of said body portion for securing the end of a chain thereto, the other end of said body portion being bifurcated, a cam lever pivoted at one of its ends between the bifurcations of said body portion, and means for releasably holding the free end of said cam lever in contact with the body portion, said means including a plate secured to the body portion with a transverse passage between the plate and body portion, a stem slidably mounted in said passage, said stem being bent at its end into the form of a hook which is adapted to engage the outer edge of the cam lever, the stem being rotatable in the passage when its hooked end is out of engagement with the cam lever, the end of the stem opposite the hooked end being screw-threaded, a screw-threaded cap fitting onto the screw-threaded end of the stem, and a coiled compression spring surrounding said stem, one end of said spring abutting against said cap and the other end abutting against the edge of the body portion.

In testimony whereof I affix my signature.

EDWARD A. KROH.